(12) United States Patent
Hubbard et al.

(10) Patent No.: US 7,511,607 B2
(45) Date of Patent: Mar. 31, 2009

(54) VEHICLE BACK-UP VIEWING SYSTEM

(75) Inventors: D. Larry Hubbard, 250 Leyden St., Denver, CO (US) 80220; Richard Smolenski, Castle Rock, CO (US)

(73) Assignee: D. Larry Hubbard, Denver, CO (US)

( * ) Notice: Subject to any disclaimer, the term of this patent is extended or adjusted under 35 U.S.C. 154(b) by 214 days.

(21) Appl. No.: 11/393,007

(22) Filed: Mar. 28, 2006

(65) Prior Publication Data

US 2007/0236364 A1 Oct. 11, 2007

(51) Int. Cl.
*B60Q 1/00* (2006.01)
*G08G 1/00* (2006.01)

(52) U.S. Cl. .................. 340/435; 340/932.2; 340/436; 340/937; 348/142; 348/148

(58) Field of Classification Search ................ 340/435, 340/932.2, 937; 348/148, 118; 396/419
See application file for complete search history.

(56) References Cited

U.S. PATENT DOCUMENTS

| | | | |
|---|---|---|---|
| 4,214,266 A | 7/1980 | Myers | 358/108 |
| 5,289,321 A | 2/1994 | Secor | 359/896 |
| 5,530,421 A * | 6/1996 | Marshall et al. | 340/436 |
| 5,642,238 A | 6/1997 | Sala | 359/871 |
| 5,670,935 A | 9/1997 | Schofield et al. | 340/461 |
| 5,793,308 A | 8/1998 | Rosinski et al. | 340/903 |
| 6,078,355 A | 6/2000 | Zengel | 348/148 |
| 6,115,651 A * | 9/2000 | Cruz | 701/1 |
| 6,175,300 B1 | 1/2001 | Kendrick | 340/436 |
| 6,201,642 B1 | 3/2001 | Bos | 359/565 |
| 6,320,612 B1 | 11/2001 | Young | 348/148 |
| 6,477,334 B1 * | 11/2002 | Chen | 396/429 |
| 6,515,581 B1 * | 2/2003 | Ho | 340/425.5 |
| 6,672,745 B1 | 1/2004 | Bauer et al. | 362/545 |
| 6,690,268 B2 | 2/2004 | Schofield et al. | 340/438 |
| 6,819,231 B2 * | 11/2004 | Berberich et al. | 340/435 |
| 7,050,089 B2 * | 5/2006 | Nakamura | 348/148 |
| 2003/0133014 A1 * | 7/2003 | Mendoza | 348/148 |
| 2006/0103727 A1 * | 5/2006 | Tseng | 348/148 |

* cited by examiner

*Primary Examiner*—Toan N Pham
(74) *Attorney, Agent, or Firm*—Marsh Fischmann & Breyfogle LLP

(57) ABSTRACT

A system for displaying an external view of a vehicle is provided. The system may comprise a video camera for capturing images external to the vehicle and a display for displaying the images for the vehicle operator. The camera is powered by electrically connecting it to the reverse lamp power line and is operable to continuously capture images when powered. The camera may be mounted in a license plate frame to further simplify installation. The camera may communicate with the display through a wireless connection. The receiver and display may be mounted in the field of view of the vehicle operator, such as on the dashboard of the vehicle.

27 Claims, 8 Drawing Sheets

VEHICLE BACK-UP VIEWING SYSTEM

FIELD OF THE INVENTION

The present invention generally relates to vision systems to assist vehicle operators and related methods of operation and installation. The invention is particularly apt for providing, in a low-cost, easy to install system, the driver of a vehicle with a view of the area immediately behind the vehicle from a rear facing camera mounted on the vehicle.

BACKGROUND OF THE INVENTION

Many vehicles, such as currently popular SUVs and minivans do not provide the driver with adequate views of the areas immediately behind and around the vehicle. To overcome this deficiency, vehicle designers and users have developed devices such as wide-angle mirrors and proximity sensors to help drivers identify any hazards that may be in proximity to the vehicle. Recently, vision systems utilizing remote cameras and displays have been incorporated to aid drivers in identifying these hazards.

Consequently, the use of vision systems to assist vehicle operators by displaying areas immediately around the vehicle is known. In such systems, cameras may be mounted in various locations throughout the vehicle and display units may be mounted within the driver's field of view. In such systems it is common to provide a rear facing camera mounted on the back of the vehicle and pointing rearward to assist the vehicle operator when operating the vehicle in a rearward direction and/or in reverse gear. Such systems include those disclosed in U.S. Pat. Nos. 4,277,804, 5,289,321, 5,793,308, 5,949,331, 6,320,612, 6,611,202, and 6,672,745, hereby incorporated by reference in their entirety.

Several shortcomings of known or otherwise proposed systems prevent this valuable safety device from being widely adopted by vehicle operators. Some vehicles provide, usually on an optional basis, integrated external viewing systems where the driver is presented with a display showing the area immediately behind the vehicle for use by the driver when the vehicle is being operated in reverse. However, vehicle manufacturers tend only to offer rear view cameras and display units on their generally costlier high-end models. Many consumers do not opt for the option because of a relatively high cost. Therefore the vast majority of vehicles sold do not have rear view cameras and display units.

Aftermarket vision systems, i.e. those systems designed to be installed into a vehicle after the vehicle has been sold to a consumer, have been proposed and also suffer from a number of drawbacks. For example, these systems can be difficult to install, requiring installers to typically run several groups of wires to install a system. This wiring may include several wires running from the camera to a display unit, power and control wires running from a vehicle's power distribution block, typically located under the dashboard, to a display unit, to a camera, and possibly to a system processing unit. These wires may be extremely difficult to run from system component to system component. For example, to run a wire from a rear facing camera to a display unit on the dashboard may require the installer to possibly route some of wires outside of the passenger compartment wherein the installer must be careful to locate the wires to avoid being damaged by road debris or conditions outside of the passenger compartment. This may also include drilling multiple holes as wires pass from the exterior to the interior of the vehicle. Alternatively, putting the wires on the interior of the vehicle may require removal of multiple interior panels if the installer attempts to hide the wires, it may include threading wires into the passenger compartment past rear seats, driver seats or consoles, all of which is time-consuming and risks damage to interior aesthetic components.

SUMMARY OF THE INVENTION

The present inventor has recognized that there exists a need to provide a low-cost, simple to install, vehicle back-up viewing system to aid operators of vehicles that do not currently contain such a system. There also exists a need for a system where a vehicle owner with little or no automotive skills can install the system. Additionally, there exists a need for a system that can be installed without the need to run wires from the rear of the vehicle to the area from which the vehicle is operated.

In view of the foregoing, one objective of the present invention is to provide a vision system and method to display to a vehicle operator at least one view of the exterior of the vehicle to enhance visibility and safety while also being simple to use and install. In the later regard, a related objective of the present invention is to provide an improved method of installing a vehicular vision system.

The above-noted objectives and additional advantages are realized in the present invention. To do so, a vehicular vision system is provided where the camera is powered by electrically connecting a portion of the system to a reverse lamp power line that powers the vehicle's external reverse lamps. To avoid negatively affecting the performance of the vehicle's external reverse lamps, the system should preferably draw less than a predetermined maximum amount of electrical power. Also, the inventor has realized that there exists a need for a low cost vehicle back up viewing system and therefore has developed the present system which has a minimal amount of components and is relatively simple to install. In the latter regard, the system may include a wireless connection between the camera and display, reducing the amount of wiring needed to install the system and further simplifying the system installation process. As a result, the invention is particularly well suited for rapid installation by automotive professionals as well as for installation by vehicle owners.

More particularly, in one aspect of the present invention, a system for displaying an external view of a vehicle is provided comprising a vehicle, a camera interconnectable with the vehicle, and a display interconnectable with the vehicle and the camera. The camera may be supplied with electrical power through an electrical connection to a reverse lamp power line in the vehicle. The reverse lamp power line in the vehicle is an electrical conductor which provides electrical power, typically at 12 VDC, to the vehicle's reverse lamps located at the rear of the vehicle. Typically, electrical power will be supplied to the vehicle's reverse lamps when a reverse gear of the vehicle is engaged by the vehicle operator. Therefore, in this aspect, the camera may receive electrical power from the reverse lamp power line when the reverse gear of the vehicle is engaged. The camera may be operable to be automatically activated and continuously capture sequential images when powered. Further, the display may display the sequential images captured by the camera. The communication link between the camera and the display may be in the form of a coaxial cable, other forms of a hard-wired connection, or, as discussed below in reference to an additional embodiment, a wireless link. When the camera is not actively capturing images, the display may display a blank or black screen or be unpowered. When actively displaying images, the display may display mirrored images to mimic the performance of traditional rearview mirrors. The display may be mounted so that an operator of the vehicle can view the display while operating the vehicle. Furthermore, the camera may include a user interface to allow a user to select whether or not the camera will capture images when the reverse lamp power line is energized. This interface may be in the form of an on-off switch.

Furthermore, the camera may be interconnected with a rear portion of the vehicle and positioned to provide images of a rear facing view from the vehicle. Preferably, the camera may have a wide-angle lens and be positioned to capture images with a horizontal field of view of greater than 90° and a vertical field of view of not less than 60°. Furthermore, it is preferable that the camera be mounted on the rear of the vehicle and directed slightly downward to provide a view equal to the vehicle's full width beginning at the ground not more than 24 inches rearward and downward of the vehicle's rear bumper. Thus in this embodiment, the display unit will display to the vehicle operator an image of the area directly behind the vehicle when the reverse gear of the vehicle is engaged.

In one embodiment, the images captured by the camera are transferred to the display through a wireless connection. In conjunction with this aspect, a transmitter interconnectable with the camera may be provided. The transmitter may, for example, be operable to be powered only when the reverse gear of the vehicle is engaged. The transmitter may receive electrical power through an electrical connection to the reverse lamp power line in the vehicle. The transmitter may be interconnected with the camera through a power connection and a communications connection. Both of these connections may be made between the transmitter and the camera via a single multi-conductor cable. The transmitter may include a user interface to allow a user to select whether or not the transmitter will transmit images when the reverse lamp power line is energized. This interface may be in the form of an on-off switch. Images captured by the camera may be sent to the transmitter along the communications connection. More preferably, the camera and transmitter may be housed in a single integrated housing.

The transmitter may wirelessly transmit the images captured by the camera to a receiver. The receiver may be interconnectable to an electrical power source of the vehicle and to a display. The electrical power source of the vehicle may be a power outlet provided by the vehicle or by direct wiring to the vehicle electrical system. In the former regard, the provided power outlet may be of the type typically provided for an electrically heated cigarette lighter or for a user to electrically connect accessories such as, for example, cellular phone chargers, portable entertainment devices, or auxiliary lights.

When the receiver receives an image signal transmitted by the transmitter, the receiver may send the received images captured by the camera to the display, which may then display the captured images for the vehicle operator to observe. The display may receive power through an electrical power connection distinct from the electrical power connection of the receiver. In this regard, the display may be interconnectable to an electrical power source of the vehicle through a power outlet provided by the vehicle or by direct wiring to the vehicle electrical system.

In regard to the interaction between the camera, transmitter, receiver and display, the sequence of events may be: image capture by the camera, transfer of image to the transmitter, transmission of the image via a wireless link, reception of the information by the receiver, transfer of the image to the display, display of the captured image. By rapidly repeating this sequence, a real-time video image of the area external to the vehicle may be displayed for the vehicle operator.

The receiver may include a user interface to allow a user to select whether or not the receiver will transfer images to the display. This interface may be in the form of an on-off switch. Similarly, the display may include a user interface to allow a user to select whether or not the display is active. This interface may be in the form of an on-off switch. In a related embodiment, the receiver and display may be contained within a single housing. This eliminates the need for communication and power cables between the receiver and display and simplifies installation of the system into the vehicle. The display and the receiver may be separate components that are selectably interconnectable through a coaxial cable. The display and the receiver may each be interconnectable to a power source of the vehicle. In another embodiment, the receiver may be interconnectable with a power source of the vehicle and the display may receive power through a power cable interconnected between the display and the receiver. In yet another embodiment, the display may be interconnectable with a power source of the vehicle and the receiver may receive power through a power cable interconnected between the display and the receiver.

The receiver or display may have a driver audio interface capable of producing an audio signal. The audio signal may be produced for a preset time period when the receiver first receives a signal from the transmitter or the audio signal may be produced continuously while the receiver is receiving a signal form the transmitter. The audio signal may attract the driver's attention when the receiver is receiving a signal from the transmitter. The audio signal from the receiver or display may include a user interface to allow a user to select whether or not the audio signal is active. This interface may be in the form of an on-off switch.

In another related embodiment, the receiver and display may receive power through a single connection to a power source inside the vehicle, such as, for example, by direct wiring to the vehicle electrical system or through an electrical power outlet as discussed above. In this embodiment, the receiver may be electrically connected to a power source in the vehicle and the display may receive power through a connection to the receiver. Alternatively, the display may be electrically connected to a power source in the vehicle and the receiver may receive power through a connection to the display.

As may be appreciated, in the embodiments discussed above, it is preferable that the power requirement of the camera and transmitter electrically connected to the reverse lamp power line be less than a predetermined amount in order to not adversely affect the performance of the reverse lamps of the vehicle. Typically, the amount of electrical power or power range that may be supplied to a reverse lamp power line in a vehicle will exceed the power requirements of the reverse lamp or lamps to be illuminated. Therefore it is preferable that the camera and transmitter together draw less power than the difference between the reverse lamp power line power range and the power requirement of the reverse lamp or lamps. In view of the foregoing, it is preferable that the power requirement of the camera and transmitter together is less than about 300 mA of current at 12 VDC.

As may be appreciated, multiple systems of the present invention may be operating in the same area simultaneously. For example, this may occur where two vehicles equipped with the present invention are stored in proximity to each other in a garage and both vehicles are engaged in reverse gear simultaneously. Several methods may be incorporated to prevent a system from displaying images captured by a camera of a system installed in another vehicle. Preferably, each transmitter may transmit a coded signal unique to that transmitter when transmitting an image captured by the camera. The receiver in the same vehicle as a transmitter will only display images which feature the unique code of its matched transmitter. Other schemes of preventing interference of wireless transmissions are widely known and may be incorporated in the present invention. Another preferable method of preventing interference is to allow a user to select from a plurality of frequencies on which the transmitter will send the image signal. The user would then select a matching frequency to be received by the receiver. In this way the two systems stored in proximity to each other of the aforementioned example can be operated on separate frequencies thereby preventing interference between the systems. In yet another embodiment, the transmitter and receiver of a system may be designed to negotiate with each other to find and utilize a frequency free from interference.

In a further embodiment of the present aspect, the system may further comprise a license plate frame, wherein the license plate frame is interconnectable with the vehicle, a license plate and the camera. As may be appreciated, since the vast majority of vehicles in the United States provide a uniform mounting system for license plates, the use of a license plate frame to mount the camera onto the vehicle simplifies installation of the camera onto the vehicle.

In a further embodiment of the present aspect, the system may further comprise a trailer hitch adapter, wherein the trailer hitch adapter is interconnectable with a trailer hitch receiver on the vehicle and the camera. The trailer hitch receiver may be of the type typically provided for interconnecting to a trailer hitch or an accessory rack, such as a bike rack. The trailer hitch adapter may be configured for interconnecting to a standard size trailer hitch receiver, such as 2" or 1¼". The trailer hitch adapter may be configured to fit trailer hitch receivers of other sizes or may be configured to be interconnectable to a range of trailer hitch receiver sizes. Multiple trailer hitch adapters may be provided. As may be appreciated, the use of a trailer hitch receiver to mount the camera onto the vehicle simplifies installation of the camera onto the vehicle.

In yet a further embodiment of the present aspect, the system may further comprise mounting hardware, wherein the mounting hardware is interconnectable with a plurality of features and surfaces of the vehicle and the camera. The mounting hardware may, for example, be interconnectable with a frame member or other feature of the underside of the vehicle, a bumper or a panel of the vehicle. The mounting hardware may provide a means of mounting the camera to said vehicle in a plurality of different ways. The method of mounting the camera may be determined by the system installer or end user based on which location provides a better view for the camera of the reverse path of the vehicle.

In a further embodiment, the license plate frame may be comprised of two frame elements. The first frame element may be interconnectable to the vehicle, the license plate, and the camera, and may be mounted to the vehicle using standard license plate installation hardware. The second frame element may be interconnectable to the first frame element in a mode to help prevent theft of both the camera and the license plate. This theft prevention embodiment may comprise the use of at least one tamper resistant fastener to connect the second frame element to the first frame element. The second frame element may be configured to prevent removal of the camera and to prevent access to the installation hardware used to connect the first frame element to the vehicle. The second frame element may also be configured to allow for unrestricted viewing of the text contained on the license plate. The tamper resistant fastener may be configured to require a special tool to install or remove the tamper resistant fastener.

In a further embodiment, an external audio interface may be electrically connected to the reverse lamp power line in a mode similar to that of the transmitter previously described. The external audio interface may be operable to produce an audible signal when powered. Therefore, when reverse is engaged in the vehicle and the reverse lamp power line is energized, the external audio interface would produce an audible signal. The external audio interface may be interconnectable with the license plate frame. The external audio interface would provide a warning tone to alert individuals in the vicinity of the vehicle that the vehicle operator has engaged the reverse gear of the vehicle. In this context, "external" refers to the function of the audio device to alert persons external to the vehicle and not to the particular location of the external audio interface. The external audio interface may also function to alert the driver that the system has been activated by producing an audio signal of sufficient volume to be heard by the driver of the vehicle. The external audio interface may include a user interface to allow a user to select whether or not the interface emits the audible signal when the reverse lamp power line is energized.

In another aspect of the present invention, a system for mounting a camera and a license plate to a vehicle is provided comprising a camera, a license plate frame comprised of two frame elements, a first frame element and a second frame element, and at least one tamper resistant fastener to secure the first frame element to the second frame element. In this aspect, the first frame element is interconnectable to a license plate mounting feature on a vehicle and may be attached, along with a license plate, to the license plate mounting feature with at least one fastener. The camera is also interconnectable with the first frame element. Further, the second frame element is interconnectable with the first frame element in such a manner as to prevent access to the camera and to each of the first frame element mounting fasteners. The second frame element may also be configured to allow for unrestricted viewing of the text contained on the license plate. Furthermore, the present aspect includes at least one tamper resistant element to secure the second frame element to the first frame element. In this manner, the first frame element, the license plate, the camera, and the second frame element are all protected against theft by the at least one tamper proof element. The tamper resistant fastener may be configured to require a special tool to install or remove the tamper resistant fastener.

In one embodiment of the current aspect, the camera may be connectable to a display through a wireless connection. In an additional embodiment, an external audio interface may be provided that may be electrically connected to a reverse lamp power line and operable to produce an audible signal when powered. Therefore, when reverse is engaged in the vehicle and the reverse lamp power line is energized, the external audio interface would be operable to produce an audible signal. The external audio interface may be interconnectable with the license plate frame. The external audio interface would provide a warning tone to alert individuals in the vicinity of the vehicle that the vehicle operator has engaged the reverse gear of the vehicle. The external audio interface may include a user interface to allow a user to select whether or not the interface emits the audible signal when the reverse lamp power line is energized.

In another embodiment, the camera may be electrically connected to a reverse lamp power line and operable to continuously capture images when powered. Therefore, when reverse is engaged in the vehicle and the reverse lamp power line is energized, the camera would be operable to capture images.

In accordance with a further aspect of the present invention, a methodology is provided for displaying an external view of a vehicle. The methodology comprises receiving power from a reverse lamp power line of a vehicle, powering a transmitter and camera with electrical power from the reverse lamp power line in direct response to the reverse lamp power line being energized, capturing vehicle external image information with the camera, delivering the image information from the camera to the transmitter, transmitting the image information to a receiver, receiving the image information by the receiver, delivering the image information from the receiver to a display, and displaying the image on the display. As may be appreciated, by repeating the above methodology at a sufficient speed, video images of an external view of the vehicle may be displayed on the display for the vehicle operator. Preferably, the transmission by the transmitter to the receiver is performed wirelessly.

As discussed previously, multiple systems of the present invention may be operating in the same area simultaneously. Therefore in an embodiment of the present aspect each transmitter may transmit a coded signal unique to that transmitter and the receiver may only display images featuring the unique code of its matched transmitter. Another preferable method of preventing interference is to determine an appropriate frequency and/or transmission protocol for use in communication between the transmitter and receiver. This may be accomplished automatically by the system or by a user selecting from a plurality of frequencies on which the transmitter will send the image signal. The user would then select a matching frequency to be received by the receiver.

In accordance with yet a further aspect of the present invention, a methodology is provided for installing a system capable of displaying an external image of a vehicle. The methodology comprises externally mounting a camera to a vehicle, mounting a transmitter to the vehicle, and connecting the transmitter to the camera and to a reverse lamp power line of the vehicle. The transmitter may be mounted to the exterior of the vehicle, for example, behind a rear bumper or to the underside of the vehicle, or to the interior of the vehicle, for example in a trunk. As may be appreciated, by installing the transmitter in a secure internal portion of the vehicle, the transmitter may be secured when the internal portion of the vehicle is secured. The present methodology may further comprise mounting a display inside the vehicle wherein the display is visible by a driver of the vehicle while the driver is operating the vehicle in reverse gear, mounting a receiver inside the vehicle, connecting the display to the receiver, and connecting the receiver to a power source of the vehicle. The receiver may be connected to a switched circuit of the vehicle at the vehicle's power distribution block or fuse box. Alternatively, the receiver may be connected to a power outlet located in the passenger area of the vehicle. More preferably, the receiver and display may be integrated into a single housing, thereby simplifying the installation process. Alternatively, the receiver and display may be separate components interconnectable to each other through at least a coaxial cable.

In a related aspect of the present invention, a kit for installing a system for displaying an external view of a vehicle is provided. The kit may comprise written instructions on how to install the system, a license plate frame, a trailer hitch adapter, a camera which may be mounted onto the license plate frame or trailer hitch adapter, a transmitter, a flexible connector for connecting the camera to the transmitter, a flexible connector to connect the transmitter to a reverse lamp power line of the vehicle, a receiver, a display, a flexible connector for connecting the display to the receiver, a flexible connector for connecting the receiver to a power source of the vehicle, and mounting hardware for connecting the above stated components. The display may be an LCD monitor with hardware to allow for multiple mounting options such as, for example, dashboard mounting, mounting to a rear view mirror, or mounting to a visor.

Additional features and advantages of the present invention will be apparent upon consideration of the further description that follows.

BRIEF DESCRIPTION OF THE DRAWINGS

For a more complete understanding of the present invention and further advantages thereof, reference is now made to the following Detailed Description of the Invention taken in conjunction with the accompanying drawings, wherein.

DETAILED DESCRIPTION OF THE INVENTION

FIGS. 1-6 illustrate one embodiment of the present invention. The illustrated embodiment provides a license plate frame mounted rear facing camera and a dashboard mounted display unit to provide a vehicle operator or driver with a video display of the area immediately behind the vehicle. As will be appreciated, various features of the illustrated embodiment may be implemented in other embodiments within the scope of the present invention, including for example embodiments which provide for cameras pointed in other directions and mounted by other means and displays mounted in other locations and mounted by other means.

Figure 1:
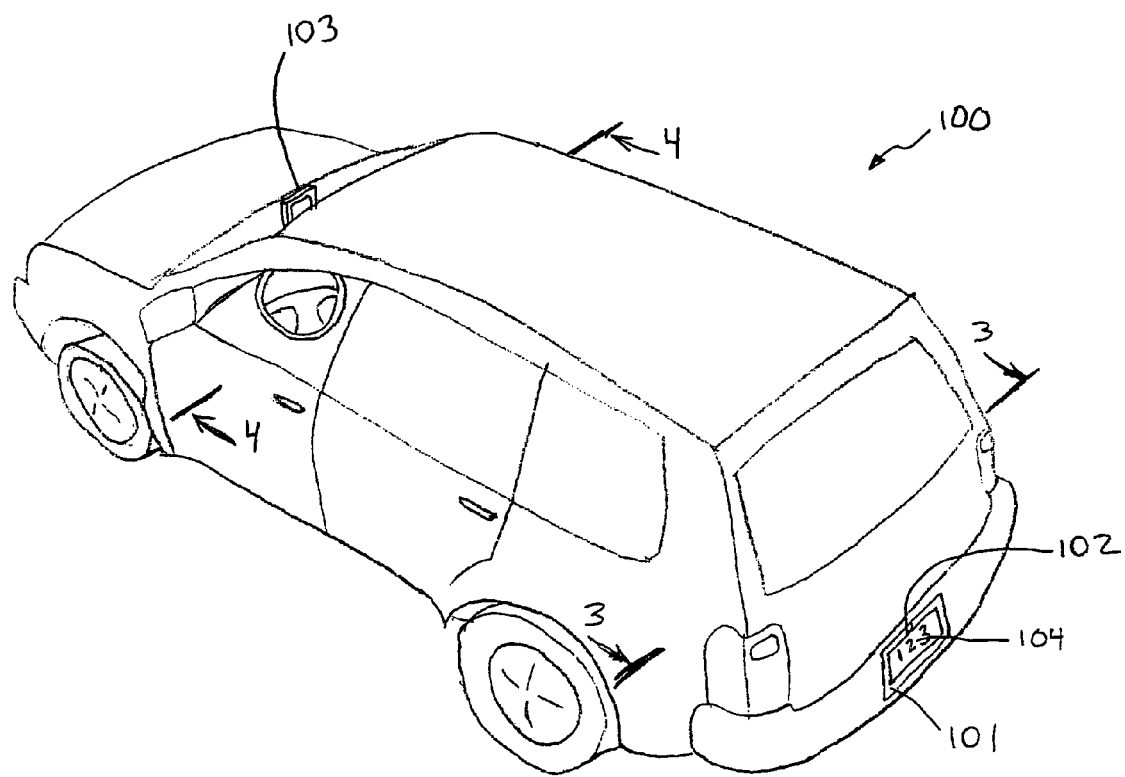
FIG. 1 is a perspective view of one embodiment of the present invention.

FIG. 1 is a perspective view of an embodiment of the present invention. Mounted to a vehicle 100 is a license plate 104 located within a license plate frame 101. Connected to the license plate frame 101, is a small camera 102. The camera 102 may be configured to capture images of the area immediately behind the vehicle. The camera 102 may be capable of capturing adequate images in low light levels such as when the only source of illumination of the area immediately behind the vehicle is the vehicle's reverse lamps. Ideally, the camera 102 is a miniature, weatherproof black and white CCD device with either a CMOS imager or a ½" or ¼" CCD imager as a sensor. Alternatively, the camera 102 may be a color camera and may be capable of reverting to black and white when illumination drops below a particular level. The camera 102 may incorporate a wide-angle lens and be pointed slightly downward to enable the driver of the vehicle to verify that no objects are in the area immediately behind the vehicle before proceeding to operate a vehicle in a rearward direction or reverse gear. In this configuration, the system allows the driver to directly observe what would typically be a blind spot directly behind the vehicle 100. The images captured by the camera 102 are displayed on a display unit 103, which is shown mounted on the dashboard of the vehicle 100.

Figure 2:
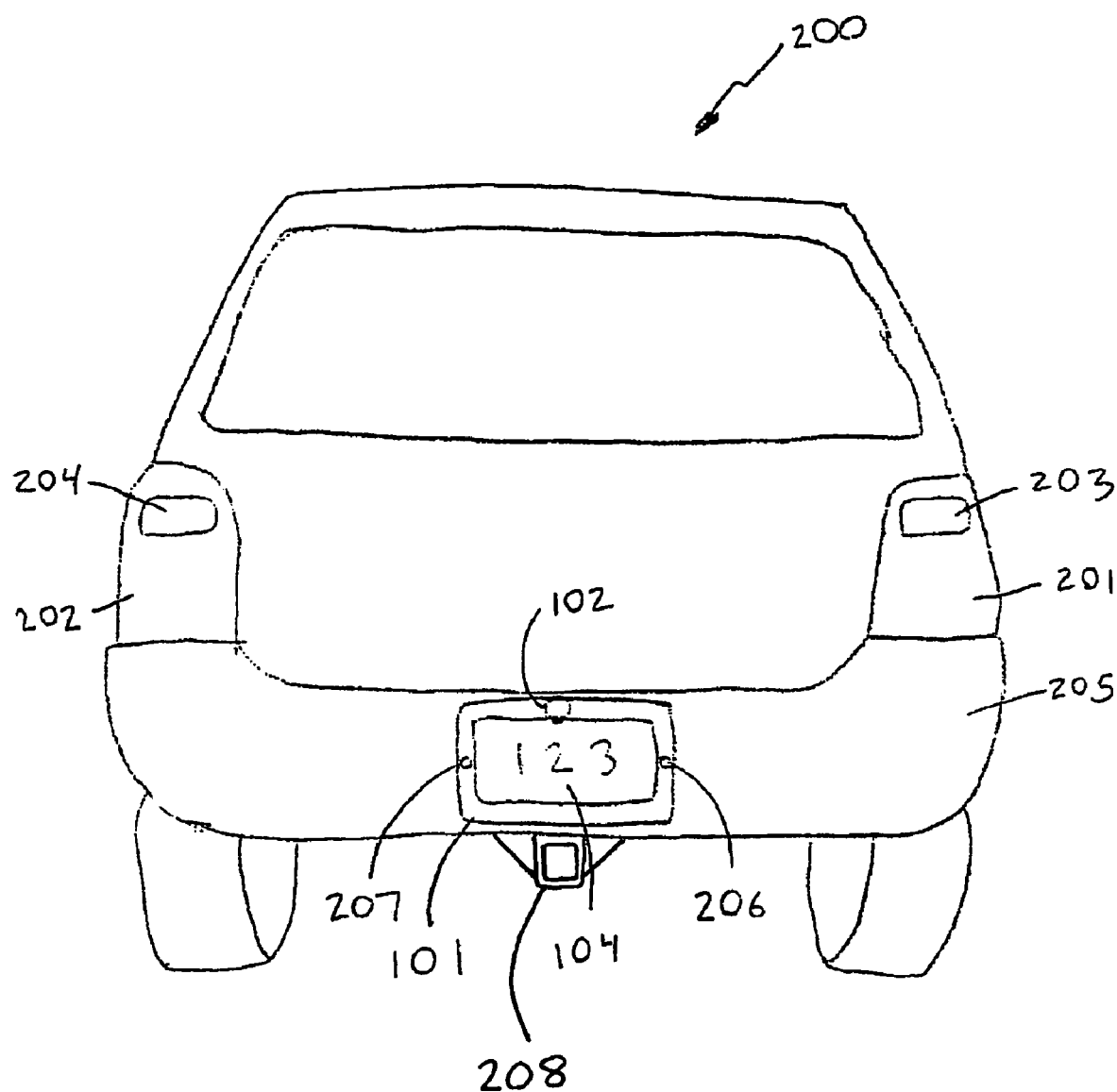
FIG. 2 is a rear view of the vehicle illustrated in FIG. 1.

FIG. 2 is a rear view of the vehicle shown in FIG. 1. In this embodiment, a typical passenger vehicle rear end 200 is depicted. Although in any given make, model, or year, many of the elements depicted maybe in FIG. 2 may be in a different configuration, generally the elements shown in FIG. 2 are present. It will be appreciated that on different types of vehicles the present invention will be configured differently yet still fall within the scope of the present invention.

As is typical with passenger vehicles, vehicle rear end 200 comprises several distinct lights and components. Typically a vehicle will have two taillights 201, 202 which are located in the rear of the vehicle 200. The two taillights 201, 202 typically produce a red light when illuminated and are capable of producing two differing levels of illumination, a first level which is illuminated when the vehicle lights are activated, and a second brighter level which is illuminated when the vehicle brakes are applied. The two taillights 201, 202 may also serve as turn indicating lights. When serving as turn indicating lights, the activated turn indicating light will flash on and off repeatedly when activated by a vehicle operator until deactivated by the operator or by an automatic cancellation function. The turn indicating function performed by the two taillights 201, 202, depicted in FIG. 2, may be performed by the separate turn indicating lights in other vehicles. The rear of the vehicle 200 also comprises two reverse lamps 203, 204. These reverse lamps 203, 204 are illuminated when the reverse gear of the vehicle is engaged. The vehicle operator activates the reverse gear when the vehicle operator wishes to operate the vehicle in a rearward direction. Therefore, because the operator generally engages reverse to operate the vehicle and a rearward direction, power is generally supplied to the reverse lamps 203, 204 when a vehicle operator wishes to operate the vehicle in a rearward direction.

In FIG. 2, a license plate 104 is shown mounted to a rear bumper 205 on the rear of the vehicle 200. Alternatively, a license plate 104 may be mounted to other components at the rear of a vehicle, such as, but not limited to, trunk lids, rear doors or rear hatches. In the illustrated embodiment of FIG. 2, the license plate 104 is mounted within a license plate frame 101. Also mounted within the license plate frame 101 is a camera 102. The license plate frame 101 restricts removal of the camera 102 and the license plate 104 by capturing the camera 102 and the license plate 104 within the license plate frame 101 and securing the frame with tamper resistant devices 206, 207. The license plate frame 101 and its features are discussed below in detail. Alternatively, the camera may be interconnected to a trailer hitch adapter (not shown) which may be interconnected to a trailer hitch receiver 208 of the vehicle. In yet another mounting alternative for the camera, the camera may be interconnected to the vehicle with mounting hardware, wherein the mounting hardware is interconnectable with a plurality of features and surfaces of the vehicle. The plurality of features and surface may include, for example, a rear bumper, frame members, other structures on the underside of the vehicle, or vehicle panels. The method of mounting the camera may be determined by the system installer or end user based on which location provides a better view for the camera of the reverse path of the vehicle.

Figure 3:
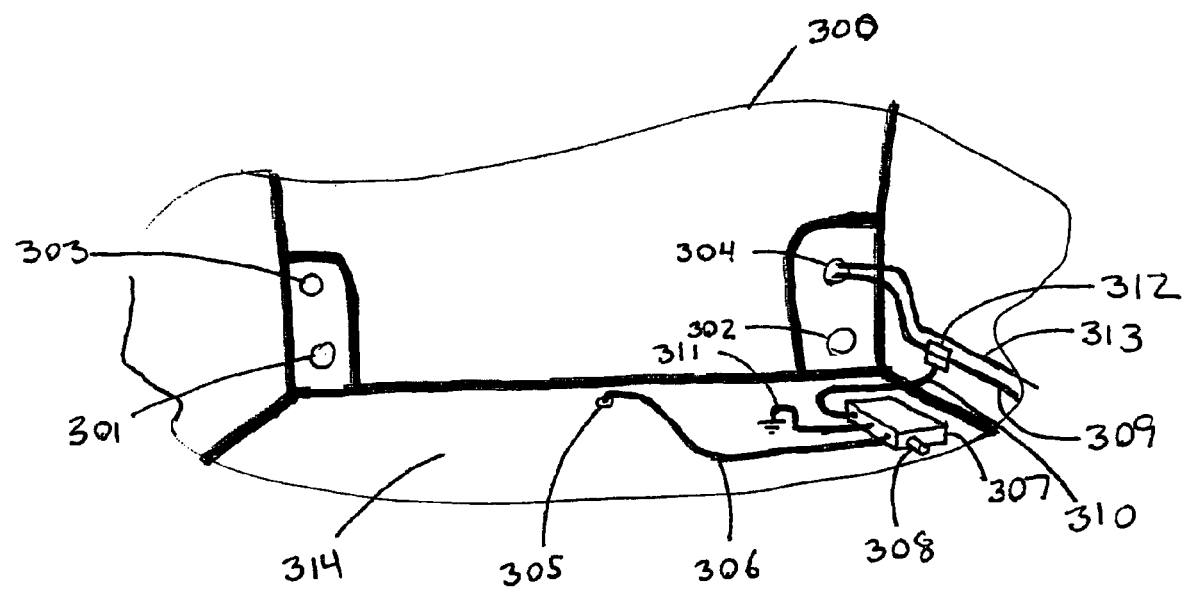
FIG. 3 is an internal view of a rear area of the vehicle illustrated in FIG. 1.

FIG. 3 illustrates the interior 300 of the rear of the vehicle 100. The perspective of the view depicted in FIG. 3 is illustrated in FIG. 1 by section 3-3. For illustrative purposes, features of a typical vehicle that are generally hidden from view such as light bulb sockets 301-304 and wiring 309, 313 are shown. Typically these features are hidden behind access panels. In the illustrated vehicle, light bulb sockets 301, 302 provide mounting for the light bulbs within taillights 201, 202, respectively. Similarly, two light bulb sockets 303, 304 provide mounting for light bulbs within the two reverse lamps 203, 204, respectively. Generally, electrical wires will be attached to the light bulb sockets 301-304 to provide electrical power to the light bulbs contained within the sockets. For illustrative purposes, only wires 309, 313 attached to reverse lamp socket 304 are shown. To this point, the items discussed in FIG. 3 are typically present on most vehicles. We now turn to aspects of the present invention depicted in FIG. 3 that may be installed in a vehicle after the vehicle manufacturer has assembled the vehicle.

Still referring to FIG. 3, a transmitter 307 may be mounted inside the rear of the vehicle 300. Alternatively, the transmitter 307 may be mounted to the exterior of the vehicle 100. For example, the transmitter 307 may be mounted behind the rear bumper 205, to a frame member (not shown) on the underside of the vehicle, to a vehicle panel, or to any other suitable structure. The transmitter 307 may be mounted in a variety of methods including, but not limited to double-sided tape, hook and loop fasteners, pinch clamp connectors or screws. In FIG. 3, the transmitter 307 is shown mounted to the floor 314 of the rear of the vehicle 300. In the illustrated embodiment, the transmitter 307 transmits images captured by the camera 102 to a display unit via a wireless connection. The camera 102 is not shown in FIG. 3. The transmitter 307 may have an external antenna 308. Alternatively, the antenna may be internal to the transmitter 307. The transmitter 307 may be powered by electrically connecting it to a reverse lamp power line 309. This may be accomplished by connecting the transmitter 307 to the reverse lamp power line 309 with a transmitter power wire 310 attached to a connector 312. The connector 312 may be a quick connect device where transmitter power wire 310 is pre-attached to the connector 312 and the connection is made to the reverse lamp power line 309 by snapping the connector 312 onto the reverse lamp power line 309. Alternatively, the transmitter power wire 310 may be electrically connected to the reverse lamp power line 309 by splicing the wires together or by any other known method of making an electrical connection between sets of wires. In another alternative connection method, the connection between the transmitter power wire 310 and the reverse lamp power line 309 may be made at a connector in the vehicle wiring system or at the reverse lamp socket 304.

Referring again to FIG. 3, the transmitter 307 may also be electrically connected to a ground of the vehicle. This is illustrated in FIG. 3 by the grounding wire 311 connected to the transmitter 307. Alternatively, the grounding wire 311 may be attached to an existing wire in the vehicle which is attached to a vehicle ground such as the reverse lamp grounding wire 313. The transmitter 307 may be attached to the camera 102 as shown in FIG. 2 by a single cable 306. The cable 306 may be run from the transmitter 307 to the camera 102 through a hole 305 in the rear area of vehicle 300. The hole 305 may be a pre-existing hole or may be drilled specifically for the cable 306. In the illustrated embodiment, the cable 306 is a single cable which may contain multiple individual wires to provide power to the camera 102 from the transmitter 307 and also provide a path for the transmission of image signals from the camera 102 to the transmitter 307.

Alternatively, separate cables for power and signal may be run between the camera 102 and the transmitter 307. In another embodiment, the camera 102 may be directly connected to the reverse lamp power line 309 and grounded independently from the transmitter ground wire 311. In yet another embodiment, the transmitter 307 may be integrated into the camera unit 102 thereby eliminating the need for a transmitter-to-camera cable 306. Although the transmitter 307 and transmitter wiring 306, 310, 311 are visible in the view of the rear area of the vehicle 300 depicted in FIG. 3, in a preferred embodiment these components may be placed in compartments or behind panels so that they are not visible when looking inside the rear area of vehicle 300.

The transmitter 307 and camera 102 are preferably capable of operation from 9 VDC to 15 VDC while not drawing more than a total of 300 mA of current. The output of the camera 102 may be standard in NTSC video output (1 V P-P at 75 ohms). The video format may be IEEE NTS standard CIF (320×240 pixels). Preferably, the camera 102 may have a minimum of 380 line resolution and produce high-quality images under a light level less than 0.1 Lux. Preferably, the camera 102 will have a wide-angle lens with a horizontal field of view greater than 90° and a vertical field of view of not less than 60°. The camera's 102 position within the license plate frame 101 may be adjustable to account for possible different locations of license plate mounts on different vehicles. The preferred camera position is to be rear facing, centered and directed slightly downward with an attitude that provides a view of the vehicle's full width beginning at the ground not more than 24 inches rearward and downward of the vehicle's rear bumper.

Functionally, when power is applied to the reverse lamp power line 309, power is applied to the transmitter 307 through the electrical connection 310 between the transmitter 307 and the reverse lamp power line 309. When powered, the transmitter 307 is operable to supply power to the camera 102. When powered, the camera 102 is operable to continually capture images of the area immediately behind the vehicle and sends these images via the cable 306 to the transmitter 307. When powered, the transmitter 307 is operable to receive the captured images from the camera 102 and transmit them wirelessly to a receiver, which is discussed below. Since the reverse lamp power line 309 is typically only powered when a reverse gear of the vehicle is engaged, the transmitter 307 will only be operable to transmit the image signals captured by the camera 102 when the reverse gear is engaged. The camera 102 and transmitter 307 power requirements are preferably such that the power drawn during operation of the camera 102 and transmitter 307 is small enough that the functionality of the reverse lamps 203, 204 is not reduced beyond acceptable levels.

Although the system in FIG. 3 illustrates the receiver 307 receiving power from the reverse lamp power line 309, it should be appreciated that other methods of powering the transmitter 307 and camera 102 may be utilized. For example, the transmitter 307 and camera 102 may be powered by solar energy through a connection to a solar cell or through a connection to a different power source in the vehicle 200. In embodiments where the transmitter 307 and camera 102 are powered by means other than the reverse lamp power line 309, the transmitter 307 may still be interconnected with the reverse lamp power line 309 and may use the presence of power on the reverse lamp power line 309 as a signal to determine when the transmitter 307 and camera 102 should be powered and/or when to capture and transmit an image signal.

An external audio interface may be provided wherein the external audio interface may be operable to produce an audible signal when powered. The external audio interface may include a user interface to allow a user to select whether or not the external audio interface is active. This interface may be in the form of an on-off switch on the external audio interface. The external audio interface may alert individuals in the vicinity of the rear of the vehicle that the vehicle operator has engaged the reverse gear of the vehicle.

The external audio interface may be integrated into the transmitter 307, the camera 102 or the license plate frame 101. The external audio interface may be electrically connected to the reverse lamp power line 309 through the same connection as the transmitter 307 previously described. The external audio interface may be a separate component that is interconnectable between a reverse lamp and a reverse lamp socket 303, 304 and receive power from the reverse lamp power line 309. In this regard, the external audio interface may have an interface engageable with a reverse lamp socket on one end and an interface engageable with a reverse lamp on the other end. Attached in this manner, the external audio interface would receive power when the vehicle operator places the vehicle in a reverse gear.

Figure 4:
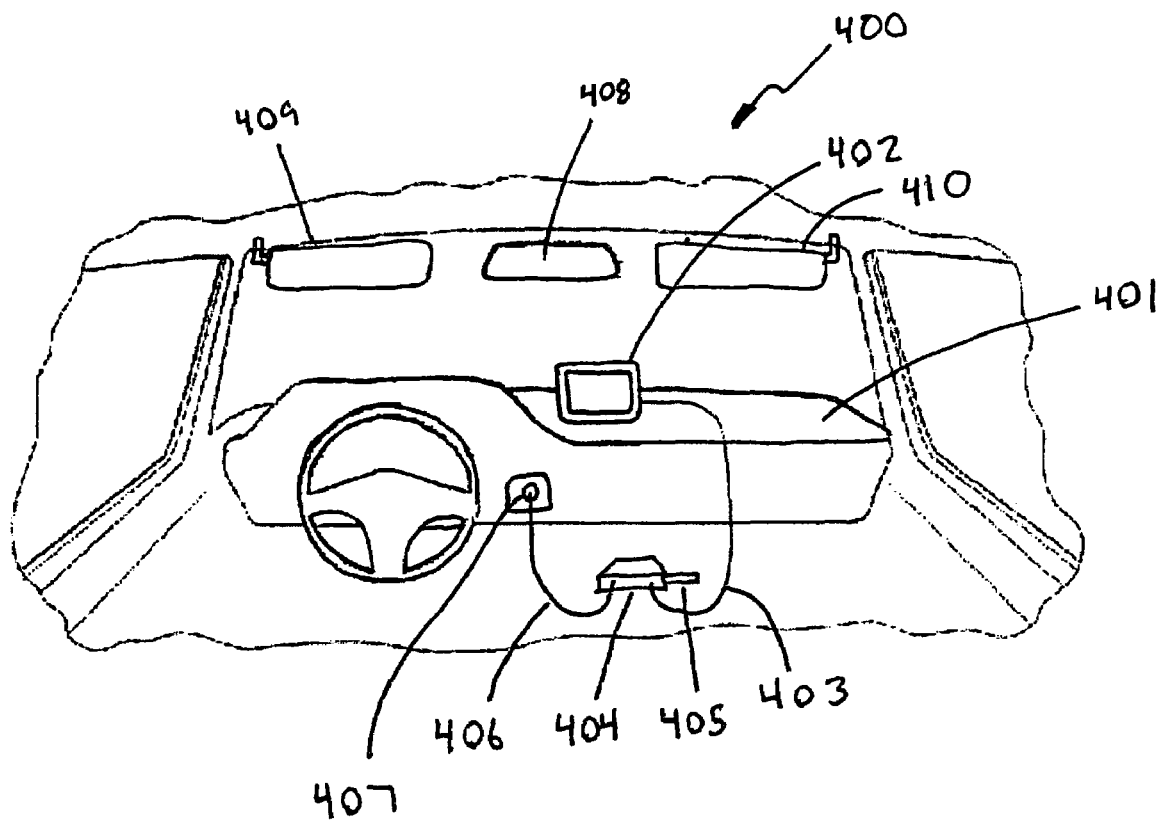
FIG. 4 is an internal view of a dashboard area of the vehicle illustrated in FIG. 1.

FIGS. 2 and 3 illustrate the image capturing and signal transmitting components of an embodiment of the present invention. Turning now to FIG. 4, the signal receiving and display components of the embodiment are illustrated. FIG. 4 depicts the front of the vehicle interior 400 of a vehicle as generally seen by a vehicle operator. The perspective of the view depicted in FIG. 4 is illustrated in FIG. 1 by section 4-4. In FIG. 4, a receiver 404 is shown located below a dashboard 401, however, the unit may be mounted in other locations, for example, under a front seat of the vehicle. The receiver 404 may be mounted in the vehicle using a variety of methods including, but not limited to, double-sided tape, hook and loop fasteners, pinch clamp connectors, or screws. Alternatively, the receiver 404 may not be mounted; i.e. it may simply be placed on the floor of the vehicle, on a center console, in a cup holder, or in any other convenient area. By not permanently attaching the receiver 404, the ease with which the receiver 404 can be removed from the vehicle is maximized. This allows the vehicle operator to remove the receiver 404 from the vehicle when it is not in use. This could be done, for example, as a security measure to prevent theft of the unit. The receiver 404 may have an external antenna 405 or the receiver 404 may have an internal antenna.

In the illustrated embodiment, the receiver 404 is powered through a cable 406 attached to a power outlet 407 in the dashboard 401. Typically, the power outlet 407 is a 12 VDC power source which serves as a power source for vehicle accessories or as a power source for a cigarette lighter. The cable 406 may have two conductors, one to connect the receiver 404 to the vehicle's 12 VDC power source, and the other to connect to the vehicle's ground. The end of the cable 406 attached to the power outlet 407 may have a connector to facilitate multiple insertions and removals of the connector to the power outlet 407. The connector may contain a fuse or fusible link in line with the 12 VDC electrical connection between the receiver 404 and the vehicle's 12 VDC power source. Alternatively, the receiver 404 may be permanently wired into the vehicle by, for example, attaching the cable 406 to a junction block or fuse box typically located behind the vehicle dashboard 401. The receiver 404 may be electrically connected to a 12 VDC power source of the vehicle that is powered when the vehicle is running or the ignition switch is placed in the accessory position. The receiver 404 may be mounted under the dashboard 401 and out of view of the vehicle operator or vehicle passengers.

The receiver 404 may be attached to a display 402 as shown in FIG. 4 by a single display cable 403. In the illustrated embodiment, the display cable 403 is a single cable which may contain multiple individual wires to provide power to the display 402 from the receiver 404 and to also provide a path for the transmission of image signals from the receiver 404 to the display 402. Alternatively, separate cables for power and signal may be run between the receiver 404 and the display 402. The separate cables may be a two-wire cable to supply 12 VDC to the display and a video cable, such as a coaxial cable, with, for example, BNC or RCA-phono style connectors. In another embodiment, the display 402 may be directly connected to a power source in the vehicle and grounded independently from the receiver 404. In this embodiment, the single cable 403 interconnected to the display 402 and the receiver 404 may be a coaxial cable. In yet another embodiment, the receiver 404 may be integrated into the display unit 402 thereby eliminating the need for a receiver-to-display cable 403. Although in FIG. 4 the receiver 404, display cable 403 and cable 406 are shown, in an alternate embodiment these components may be placed so that they are not visible to the vehicle operator or vehicle passengers. Ideally, the receiver 404 will require no more than 100 mA of current at 12 VDC when receiving images and transmitting those images to the display 402.

In the illustrated embodiment, the display 402 is located on the vehicle dashboard 401. This location places the display 402 within the vehicle operator's field of view without interfering with the vehicle operator's forward perspective similar to the placement of a typical rearview mirror 408. Alternatively, the display 402 may be placed in other locations such as, but not limited to, on a center console, within the instrument cluster of the vehicle, attached to an overhead visor 409, 410, or attached to a rearview mirror 408. To allow for flexibility in mounting options, the display 402 should be lightweight. The display 402 may also be integrated into a rearview mirror 408. As with the transmitter 307 and receiver 404, the display 402 may be mounted in the vehicle in a variety of methods including, but not limited to double-sided tape, hook and loop fasteners, or screws. Alternatively, a bracket (not shown) may be mounted to the vehicle where the display 402 can be quickly inserted or removed from the bracket. This allows the vehicle operator to remove the display 402 from the vehicle when it is not in use. This could be done, for example, as a security measure to prevent theft of the display 402.

The display 402 may be an active matrix TFT LCD device with sufficient brightness and contrast to be viewed by a vehicle operator in bright sunlight or total darkness. Ideally, the display 402 has brightness and contrast controls available to the vehicle operator for adjustment. Preferably, the display 402 has a contrast ratio of not less than 300:1 and a brightness of 400 $cdm^2$ (Candelas per square meter). The display 402 size is preferably between 4" and 6", measured diagonally, and not more than about 1" thick. The display 402 ideally has a minimum viewing angle of about 70° for easier viewing by the vehicle operator. The display 402 may be capable of displaying black and white images, color images, or both. The display 402 preferably does not require more than 500 mA of current at 12 VDC when displaying images.

The receiver 404 may have a driver audio interface capable of producing an audio signal. The audio signal may be produced for a preset time period when the receiver 404 first receives a signal from the transmitter 307 or the audio signal may be produced continuously while the receiver 404 is receiving a signal form the transmitter 307. The audio signal may attract the driver's attention when the receiver 404 is receiving a signal from the transmitter 307. The audio signal from the receiver 404 may include a user interface to allow a user to select whether or not the audio signal is active. This interface may be in the form of an on-off switch on the receiver 404. The receiver 404 may also include an interface that allows the user to adjust the volume of the audio signal.

Alternatively, the driver audio interface may be part of the display 402. The audio signal may be produced for a preset time period when the display 402 first receives a signal from the receiver 404 or the audio signal may be produced continuously while the display 402 is receiving a signal form the receiver 404. The audio signal from the display 402 may include a user interface to allow a user to select whether or not the audio signal is active. This interface may be in the form of an on-off switch on the display 402. The display 402 may also include an interface that allows the user to adjust the volume of the audio signal.

Functionally, the receiver 404 receives signals sent by the transmitter 307 as discussed above. When the receiver 404 is powered and receives signals sent by the transmitter 307, the receiver 404 transmits the image signals over the display cable 403 to the display. When no image signal is being transmitted to the receiver 404, the display remains dark. The receiver 404 may also only provide power over the display cable 403 when transmitting an image signal. Alternatively, the display 402 may be powered but not active until the transmitter 307 transmits a signal to the display 402. When powered and receiving an image signal from the receiver 404, the display 402 may display an image captured by the camera 102. This image may be the same image captured by the camera 102 or it may be a mirrored image to mimic the performance of a typical rearview mirror such as rearview mirror 408. How the image is displayed may be selectable by the vehicle operator.

To ensure any given receiver in a first vehicle is receiving and displaying images from the camera attached to the first vehicle, and not from a camera attached to a second vehicle in proximity to the first vehicle, the receiver 404 may be matched to the transmitter 307. The matching may be accomplished by independent coding where each transmitter 307 is matched to a corresponding receiver 404 which will only receive and display images transmitted by its matched transmitter 307. Alternatively, the system may allow a user to select the frequency on which the transmitter 307 and receiver 404 communicate. Other methods of preventing interference between systems in adjacent vehicles may be utilized. These methods of preventing interference prevent any given receiver from displaying images from any transmitter except for the transmitter attached to that vehicle. This is particularly beneficial for owners of multiple systems in multiple vehicles where the vehicles may be operated simultaneously and in proximity to each other.

The wireless communications may be performed within the 902 MHz-928 MHz frequency range or the 2.40 GHz-2.483 GHz frequency range. Other frequency ranges may also be used for the wireless communications link. The transmission power is preferably between 10 microwatts and 1 milliwatt.

Figure 5A:
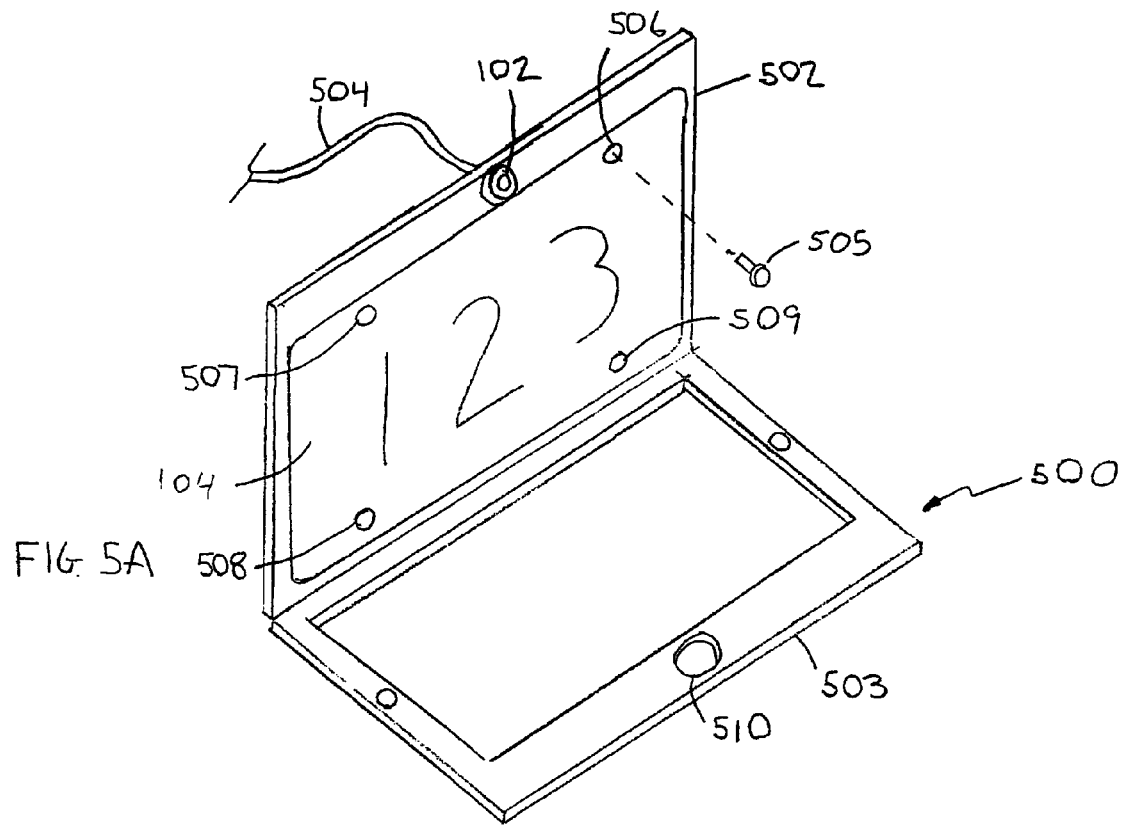
FIGS. 5A and 5B are perspective views of a camera and license plate frame in accordance with an embodiment of the present invention.
Figure 5B:
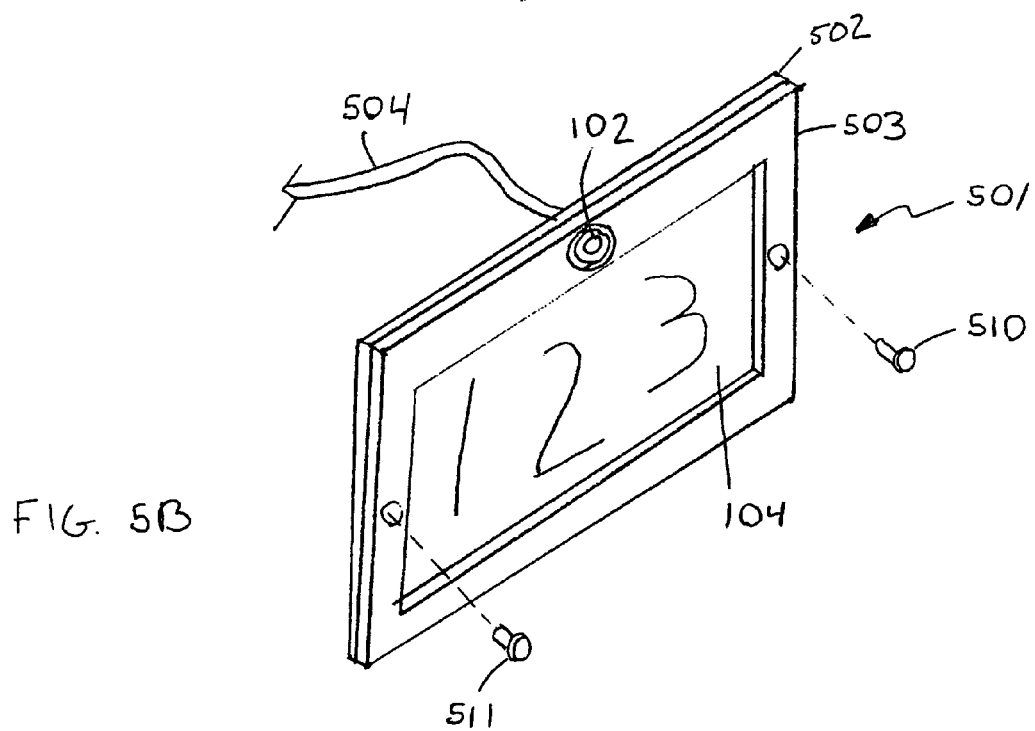

FIGS. 5A and 5B illustrate in detail an embodiment of the license plate frame 101 discussed above. FIG. 5B illustrates an embodiment of the license plate frame 101 wherein a license plate 104 and camera 102 are securely contained within the closed license plate frame 501. FIG. 5A illustrates the same embodiment as shown in FIG. 5B but with the license plate frame 101 in an open position 500 to illustrate details of the embodiment. The presently illustrated embodiment of the license plate frame 101 is comprised of two sections, a rear section 502 and a front section 503. The rear section 502 features four mounting holes 506-509 that correspond in positioning and size to the standard mounting pattern used for vehicle license plates in the United States. Alternatively, mounting patterns for other types of license plates may be used. The rear section 502 provides a means for mounting a camera 102. The rear section 502 may have a hole in the area where the camera 102 is mounted to allow a cable 504 to pass through the rear section 502. This may be the same cable as cable 306 illustrated in FIG. 3. The rear section 502 and license plate 104 may be mounted to a vehicle using standard license plate mounting hardware such as bolts or screws. The mounting hardware is attached to the vehicle by passing it through the license plate holes and the rear section 502 and attaching it to the license plate mounting holes on the vehicle. This is illustrated by the mounting screw 505 in FIG. 5A. Additional mounting hardware may be placed through holes 507-509.

Once the license plate 104 and rear section 502 are securely mounted to the vehicle, a front section 503 of the license plate frame 101 may be installed. In the illustrated embodiment the rear section 502 and the front section 503 are connected by a hinged joint. Alternatively, the rear section 502 and front section 503 may be connected by other means or they may be separable components. In the illustrated embodiment, the front section 503 is rotated into its final position as shown in FIG. 5B. In this position, the front section 503 captures both the camera 102 and the license plate 104, restricting the ability of either to be removed without first rotating the front section 503 away from the rear section 502. The front section 503 may then be secured to the rear section 502 by means of at least one tamper resistant component. In the illustrated embodiment of FIG. 5B, two tamper resistant fasteners 510, 511 are used to secure the front section 503 to the rear section 502 thereby providing protection against theft of the camera 102 and/or the license plate 104. The tamper resistant fasteners 510, 511 may be captive to the front section 503. The tamper resistant fasteners 510, 511 may be of a configuration that requires a special tool to insert and/or remove the fasteners.

Additionally, the camera 102 may include a noise emitting device (not shown) such as a beeper that is operable to produce an audible sound when power is supplied to the camera. The noise emitting device may be attached to the license plate frame and powered in the same manner as the camera by connecting the noise emitting device to the reverse lamp power line and a ground.

Figure 6:
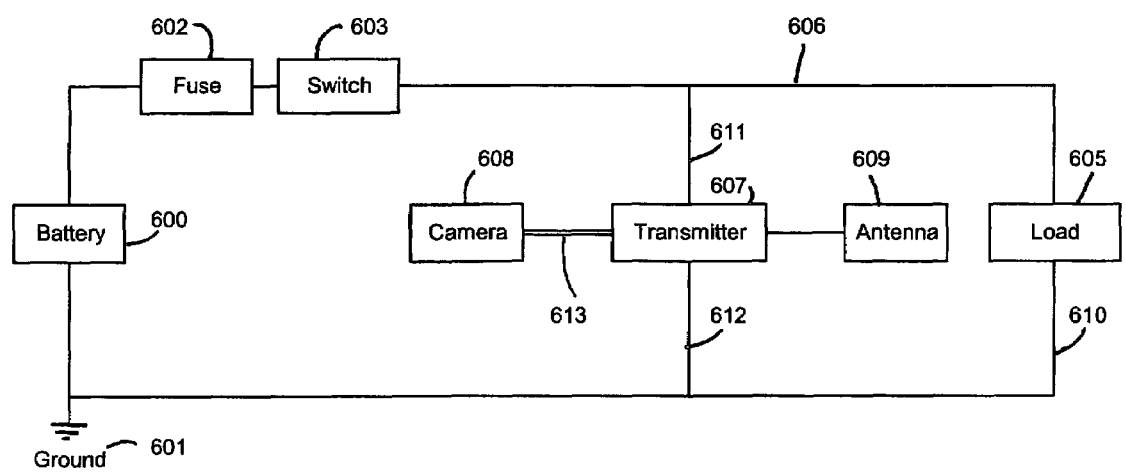
FIG. 6 is a block diagram illustrating a camera and transmitter in accordance with an embodiment of the present invention.

FIG. 6 is a block diagram of how the above discussed transmitter 307 and camera 102 may be integrated into a vehicle's electrical system. Specifically FIG. 6 illustrates a portion of a vehicle's electrical system that controls the vehicle's reverse lamps 203, 204 illustrated in FIG. 2. A battery 600 provides electrical energy to illuminate the vehicle's reverse lamps. The reverse lamps in the vehicle are depicted in FIG. 6 by the load 605. The load 605 may be connected to the battery through a fuse 602 and a switch 603. The switch 603 may be normally open and is typically only closed when reverse gear is engaged in the vehicle. When the switch 603 is closed, power can flow from the battery 600 through the reverse lamp power line 606 to the load 605 thus illuminating the vehicle's reverse lamps 203, 204. A ground line 610 from the load 605 electrically connects the load 605 to the same ground 601 to which the battery 600 is connected.

The transmitter 607 may be connected in parallel with the load 605 as illustrated in FIG. 6. Specifically, the transmitter 607 may be connected to the reverse lamp power line 606 by a transmitter power wire 611 and to the vehicle ground 601 by a transmitter ground wire 612. The transmitter 607 may be connected to the camera 608 by a cable 613. In the illustrated embodiment, the cable 613 may contain multiple individual wires to provide power to the camera 608 from the transmitter 607 and to also provide a path for the transmission of image signals from the camera 608 to the transmitter 607. An antenna 609 is connected to the transmitter 607 and is used to transmit image signals to the receiver 404 shown in FIG. 4.

Figure 7:
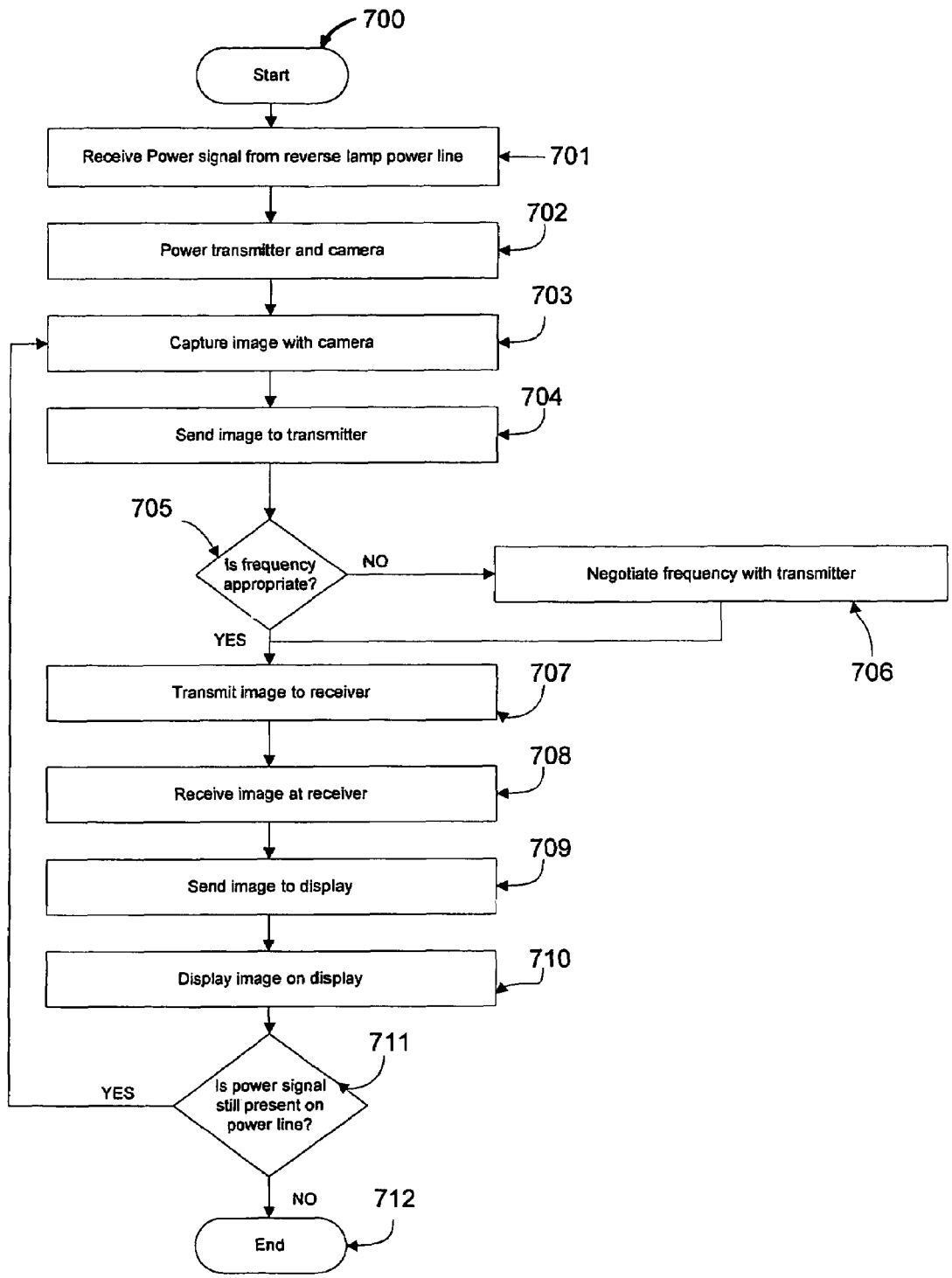
FIG. 7 is a flowchart for a method of displaying an external view of a vehicle in accordance with an embodiment of the present invention.

FIG. 7 illustrates an associated method of displaying an external view of the vehicle on a display device. The starting point 700 of the illustrated methodology is the system as described above where the vehicle is running, hence the receiver and display are powered, and the reverse gear of the vehicle is not engaged and therefore power is not being supplied to the reverse lamp power line. Once the reverse gear is engaged, the reverse lamp power line will be powered and the transmitter will receive 701 power from the powered reverse lamp power line. This will power 702 the transmitter and camera. Once powered, the camera will capture 703 an image and send 704 the captured image to the transmitter. The transmitter may then determine 705 an appropriate frequency for transmission to the receiver. This step may take several forms such as, but not limited to, a unique preset frequency or code, a frequency selectable by a user by, for example, a switch on the transmitter and a switch on the receiver, or an active frequency selection system where the transmitter and receiver actively negotiate 706 a frequency free from interference. Once an appropriate frequency is determined, the transmitter may then transmit 707 an image signal to the receiver. The image signal may then be received 708 by the receiver, which then sends 709 the image to the display where it is displayed 710 for the vehicle operator to see. If the reverse lamp power line remains powered 711, the camera will capture 703 another image and the transmit and display sequence will be repeated. If the reverse lamp power line becomes unpowered 711, no more images are transmitted or displayed and the sequence is ended 712 until power is returned to the reverse lamp power line in which case the entire method would be reinitialized 700.

Figure 8:
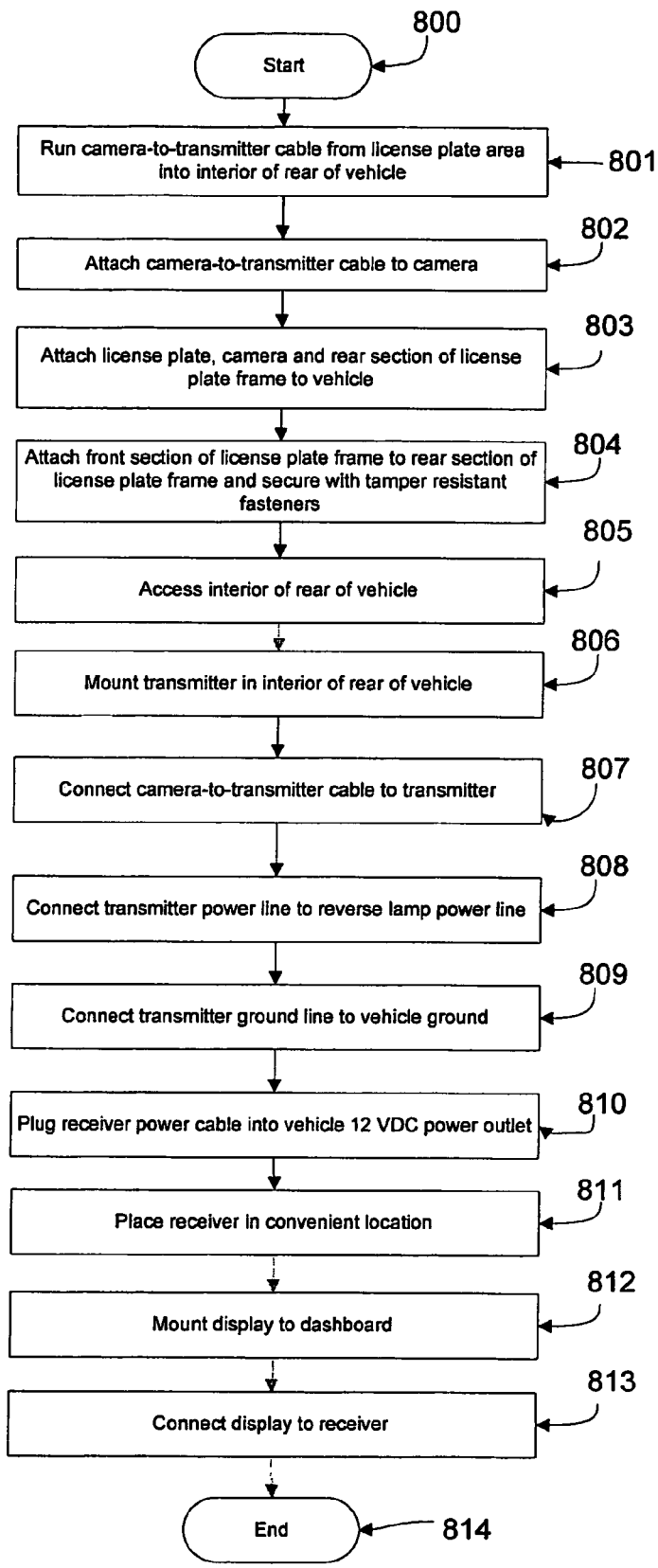
FIG. 8 is a flowchart for a method of installing into a vehicle a system capable of displaying external images of the vehicle in accordance with an embodiment of the present invention.

FIG. 8 illustrates an associated method of installing an improved vehicle back up viewing system into a vehicle. Although the illustrated embodiment depicts mounting the camera in the context of a license plate frame, it will be appreciated that similar embodiments exist wherein the camera is mounted by means of a trailer hitch adapter or mounting hardware, as previously discussed. The starting point 800 is a vehicle in which the back up viewing system is to be installed. The first step may be to run 801 the camera-to-transmitter cable from the area of the license plate into the interior of the rear of the vehicle. The next step in this illustrated methodology may be to attach 802 the camera-to-transmitter cable to the camera. Alternatively the cable may be permanently attached to the camera in which case the step would not need to be performed. Next, the camera, license plate frame rear section, and license plate may be attached 803 to the vehicle. This may be accomplished by first mounting the camera to the license plate frame rear section, aligning the mounting holes of the license plate frame rear section with the standard license plate mounting holes of the vehicle, then aligning the license plate mounting holes with the license plate frame rear section mounting holes. Finally, fasteners such as screws may be used to bolt the license plate and license plate frame to the vehicle.

The front section of the license plate frame may next be attached 804 to the rear section of the license plate frame. The front section may then be secured in place using tamper resistant hardware. Next, the interior of the rear portion of the vehicle is accessed 805. The transmitter may then be mounted 806 in the interior of the rear of the vehicle and the camera-to-transmitter cable may be connected 807 to the transmitter. Alternatively, the transmitter may be mounted on the exterior of the vehicle. Next the transmitter power line may be connected 808 to the reverse lamp power line. This may be accomplished by using a snap-on type connector as described above, or by splicing the wires together, or by any other known means of electrically connecting wires. The transmitter ground line may then be connected 809 to a vehicle ground.

The remaining installation steps occur in the vehicle operator's area of the interior of the vehicle. The receiver may be connected 810 to a 12 VDC power source of the vehicle. This may encompass plugging a connector on the end of the receiver power cable into an existing power outlet in the vehicle's dashboard. Alternatively, this may encompass hard wiring the receiver power cable into a junction block or fuse box of the vehicle. The receiver may then be placed in a convenient location and/or permanently mounted to the vehicle. Next the display may be mounted 812 to vehicle. The display may be mounted permanently, for example by two-sided tape or screws or it may be mounted temporarily for example by suction cups or removable clamps. To complete the installation, the display may be connected 813 to the receiver by connecting the first end of the display cable to the display and the second end of the cable to the receiver.

As may be appreciated, various extensions, adaptations and modifications of the described back-up viewing systems and described method embodiments may be made and are intended to be within the scope of the present invention.

What is claimed:

1. A method for displaying an external view of a vehicle, comprising the steps of:
   electrically interconnecting a camera via wiring to a reverse lamp power line of a vehicle;
   drawing, by the camera, a predetermined maximum amount of power from said reverse lamp power line;
   capturing vehicle external view image information with said camera during powering of said camera;
   wirelessly transmitting during powering of said camera said image information from a transmitter to a display; and
   displaying said image on said display.

2. a method as set forth in claim 1, wherein said is electrically interconnected to the reverse lamp power line.

3. A method as set forth in claim 2, further comprising the step of:
   drawing, by the transmitter, a predetermined maximum amount of power from said reverse lamp power line.

4. A method as set forth in claim 3, wherein the sum of said predetermined maximum amount of power drawn by said camera and said predetermined maximum amount of power drawn by said transmitter does not exceed about 300 mA at 12 VDC.

5. A method as set forth in claim 3, further comprising the steps of:
   interconnecting said transmitter to interior of said vehicle; and
   interconnecting said transmitter to said camera.

6. A method as set forth in claim 5, wherein said interior of said vehicle is securable.

7. A method as set forth in claim 2, further comprising the steps of:
   receiving by a receiver said transmitted image information; and
   directing said image information from said receiver to said display.

8. A method as set forth in claim 7, further comprising the steps of:
   interconnecting said receiver with said vehicle;
   electrically interconnecting said receiver to an electrical system of said vehicle separate from electrical interconnection of the camera to the reverse lamp power line; and
   drawing electrical power from said electrical system of said vehicle to power said receiver.

9. A method as set forth in claim 8, wherein electrically interconnecting said receiver to said electrical system of said vehicle comprises connecting said receiver to a power outlet of said vehicle.

10. A method as set forth in claim 8, wherein electrically interconnecting said receiver to said electrical system of said vehicle comprises connecting said receiver to a switched circuit of said vehicle.

11. A method as set forth in claim 7, wherein said transmitter and said receiver are matched in that said receiver only directs images to said display that are transmitted by said matched transmitter.

12. A method as set forth in claim 7, further comprising the steps of:
   interconnecting said receiver to an interior portion of said vehicle;
   interconnecting said display to an interior portion of said vehicle;
   interconnecting a first end of a cable to said receiver;
   interconnecting a second end of said cable to said display, wherein said display is visible by a driver of said vehicle while said driver is operating said vehicle in reverse; and
   connecting said receiver to a power source of said vehicle.

13. A method as set forth in claim 12, wherein said cable is a coaxial cable, further comprising the step of:
   connecting said display to a power source of said vehicle.

14. A method as set forth in claim 7, further comprising the steps of:
   interconnecting an integrated receiver and display unit inside said vehicle, wherein the display of said integrated receiver and display unit is visible by a driver of said vehicle while said driver is operating said vehicle in reverse; and
   connecting said integrated receiver and display unit to a power source of said vehicle.

15. A method as set forth in claim 7, wherein said wireless transmitting comprises determining an appropriate frequency and/or transmission protocol for use in communicating with said receiver.

16. A method as set forth in claim 15, wherein said determination of an appropriate frequency and/or transmission protocol comprises selection of an appropriate frequency and/or transmission protocol for use in said wireless communication by a user.

17. A method as set forth in claim 15, wherein said determination of an appropriate frequency and/or transmission protocol comprises automatic selection of an appropriate frequency and/or transmission protocol for use in said wireless communication by a selection module.

18. A method as set forth in claim 1, further comprising the steps of:
   interconnecting said display with said vehicle;
   electrically interconnecting said display to an electrical system of said vehicle;

drawing electrical power from said electrical system of said vehicle to power said display.

19. A method as set forth in claim 18, wherein the step of interconnecting said display with said vehicle further comprises the step of:
   interconnecting said display unit inside said vehicle, wherein the display of said display unit is visible by a driver of said vehicle while said driver is operating said vehicle in reverse.

20. A method as set forth in claim 18, wherein electrically interconnecting said display to said electrical system of said vehicle comprises connecting said display to a power outlet of said vehicle.

21. A method as set forth in claim 18, wherein electrically interconnecting said display to said electrical system of said vehicle comprises connecting said display to a switched circuit of said vehicle.

22. A method as set forth in claim 1, further comprising the steps of:
   interconnecting said camera with a license plate frame;
   interconnecting a license plate with said license plate frame; and
   interconnecting said license plate frame interconnected with said camera and said license plate with said vehicle.

23. A method as set forth in claim 1, further comprising the steps of:
   interconnecting an external audio interface with said vehicle; and
   electrically interconnecting said external audio interface with said reverse lamp power line.

24. A method for displaying an external view of a vehicle, comprising the steps of:
   electrically powering a camera with power via wiring interconnected to a reverse lamp power line of the vehicle;
   drawing, by the camera, power from said reverse lamp power line;
   capturing vehicle external view image information with said camera during powering of said camera;
   wirelessly transmitting during said powering of said camera said image information to a display;
   receiving by a receiver said transmitted image information;
   directing said image information from said receiver to a display;
   electrically interconnecting said receiver to an electrical system of said vehicle separate from electrical interconnection of the camera and the reverse lamp power line;
   drawing electrical power from said electrical system of said vehicle to power said receiver and
   displaying said image on said display.

25. A method for installing a system capable of displaying an external image of a vehicle, comprising the steps of:
   externally mounting a camera to a vehicle;
   mounting a transmitter to said vehicle;
   connecting said transmitter to said camera with at least one flexible wire connector;
   connecting via wiring said transmitter to a reverse lamp power line of said vehicle, wherein said camera and said transmitter are powered by power from said reverse lamp power line; and
   wirelessly transmitting from said transmitter during powering of said camera image information captured by said camera to a display.

26. A method as set forth in claim 25, wherein said mounting of said transmitter comprises the steps of:
   accessing an internal portion of said vehicle; and
   mounting said transmitter in said internal portion of said vehicle.

27. A kit for installing a system for displaying an external view of a vehicle, said kit comprising:
   instructions describing the method of claim 25;
   a license plate frame;
   a camera interconnectable with said license plate frame;
   a transmitter;
   a flexible wire connector for connecting said camera to said transmitter;
   a flexible wire connector to connect said transmitter to a reverse lamp power line of said vehicle;
   a receiver;
   a display;
   a flexible connector for connecting said display to said receiver;
   a flexible connector for connecting said receiver to a power source of said vehicle;
   a trailer hitch adapter; and
   mounting hardware.

* * * * *

UNITED STATES PATENT AND TRADEMARK OFFICE
CERTIFICATE OF CORRECTION

| | | |
|---|---|---|
| PATENT NO. | : 7,511,607 B2 | Page 1 of 1 |
| APPLICATION NO. | : 11/393007 | |
| DATED | : March 31, 2009 | |
| INVENTOR(S) | : Hubbard et al. | |

It is certified that error appears in the above-identified patent and that said Letters Patent is hereby corrected as shown below:

Column 17, line 47, delete "a" and insert therefor --A--; and
Column 17, line 47, after "said", insert --transmitter--.

Signed and Sealed this

Nineteenth Day of May, 2009

JOHN DOLL
*Acting Director of the United States Patent and Trademark Office*